(12) United States Patent
Hahn et al.

(10) Patent No.: US 11,584,998 B2
(45) Date of Patent: Feb. 21, 2023

(54) ELECTROLYSIS UNIT AND ELECTROLYSER

(71) Applicant: Siemens Energy Global GmbH & Co. KG, Munich (DE)

(72) Inventors: Alexander Hahn, Rottenbach (DE); Hagen Hertsch, Erlangen (DE); Stephan Rückert, Erlangen (DE); Thomas Purucker, Hessdorf (DE); Alexander Spies, Kemnath (DE); Jochen Straub, Erlangen (DE); Richard Wagner, Effeltrich (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 70 days.

(21) Appl. No.: 16/762,754

(22) PCT Filed: Sep. 21, 2018

(86) PCT No.: PCT/EP2018/075554
§ 371 (c)(1),
(2) Date: May 8, 2020

(87) PCT Pub. No.: WO2019/101392
PCT Pub. Date: May 31, 2019

(65) Prior Publication Data
US 2021/0172074 A1 Jun. 10, 2021

(30) Foreign Application Priority Data

Nov. 24, 2017 (EP) .................................. 17203524

(51) Int. Cl.
*C25B 1/04* (2021.01)
*C25B 15/08* (2006.01)
(Continued)

(52) U.S. Cl.
CPC .................. *C25B 1/04* (2013.01); *C25B 9/23* (2021.01); *C25B 13/00* (2013.01); *C25B 15/083* (2021.01); *C25B 15/087* (2021.01)

(58) Field of Classification Search
CPC .... C25B 1/04; C25B 9/23; C25B 9/77; C25B 15/08; C25B 15/087; C25B 13/00
See application file for complete search history.

(56) References Cited

U.S. PATENT DOCUMENTS 1,222,809 A * 4/1917 Sebille ...................... C25B 9/77
290/1 R
4,323,442 A 4/1982 Lantin et al.
(Continued)

FOREIGN PATENT DOCUMENTS

CH 108697 A 2/1925
CN 101654787 A 2/2010
(Continued)

OTHER PUBLICATIONS

PCT International Search Report and Written Opinion dated Jan. 15, 2019 corresponding to PCT/EP2018/075554; priority filing date Sep. 21, 2018.

*Primary Examiner* — Ciel P Contreras
(74) *Attorney, Agent, or Firm* — Wolter Van Dyke Davis, PLLC

(57) ABSTRACT

An electrolytic device and to a method for operating an electrolysis of water with at least one electrolysis cell, the electrolysis cell having an anode compartment having an anode and a cathode compartment having a cathode. The anode compartment is separated from the cathode compartment by a proton exchange membrane. The anode compartment is suitable for holding water and oxidising the water on the anode to form a first product including oxygen and the cathode compartment is suitable for holding water and reducing the water on the cathode to a second product (Continued)

including hydrogen. Furthermore, the electrolysis device includes a first gas precipitation device for precipitation of oxygen, the first gas precipitation device for carrying out a natural water circulation being arranged above the electrolysis cell.

17 Claims, 3 Drawing Sheets

(51) Int. Cl.
    *C25B 9/23*     (2021.01)
    *C25B 13/00*     (2006.01)

(56) References Cited

U.S. PATENT DOCUMENTS

| | | | | |
|---|---|---|---|---|
| 5,427,658 | A | * | 6/1995 | Allen .................... C25B 15/02 |
| | | | | 204/266 |
| 5,484,512 | A | * | 1/1996 | Sasaki ..................... C25B 9/73 |
| | | | | 204/263 |
| 2002/0070123 | A1 | | 6/2002 | Andrews et al. |
| 2012/0080027 | A1 | * | 4/2012 | Navo Gilabertei ..... F24S 20/20 |
| | | | | 126/646 |
| 2013/0126360 | A1 | * | 5/2013 | Ise ............................ C25B 1/04 |
| | | | | 205/412 |
| 2016/0368789 | A1 | * | 12/2016 | Manabe .................... G21F 9/08 |
| 2018/0179649 | A1 | * | 6/2018 | Fleischer .................. C25B 9/17 |

FOREIGN PATENT DOCUMENTS

| | | |
|---|---|---|
| CN | 204849043 U | 12/2015 |
| DE | 3837354 A1 | 5/1990 |
| DE | 102011053142 A1 | 2/2013 |
| JP | 2002285368 A | 10/2002 |
| JP | 2003342771 A | 12/2003 |
| JP | 2006324221 A | 11/2006 |
| JP | 2017078197 A | 4/2017 |
| KR | 101769751 B1 | 8/2017 |
| WO | 2006123831 A1 | 11/2006 |
| WO | 2017069083 A1 | 4/2017 |

* cited by examiner

ELECTROLYSIS UNIT AND ELECTROLYSER

CROSS REFERENCE TO RELATED APPLICATIONS

This application is the US National Stage of International Application No. PCT/EP2018/075554 filed 21 Sep. 2018, and claims the benefit thereof. The International Application claims the benefit of European Application No. EP17203524 filed 24 Nov. 2017. All of the applications are incorporated by reference herein in their entirety.

FIELD OF INVENTION

The invention relates to an electrolysis unit having at least one electrolysis cell and to a method for operating the electrolysis cell.

BACKGROUND OF INVENTION

An electrolyzer is an apparatus which brings about a conversion of matter using electric current (electrolysis). In accordance with the variety of different electrolysis operations, there is also a large number of electrolyzers, for example an electrolyzer for hydrogen electrolysis.

Current considerations are directed to producing substances of value using excess energy from renewable energy sources at times when there is a lot of sun or a lot of wind, that is to say using above-average solar power or wind power generation. One substance of value may in particular be hydrogen, which is generated using water electrolyzers. The hydrogen can be used for example to produce what is known as P2G gas.

This involves a (hydrogen electrolysis) electrolyzer firstly generating hydrogen using electrical energy, in particular from wind energy or solar energy. Thereafter, the hydrogen is used together with carbon dioxide in a Sabatier process to produce methane. The methane can then by way of example be fed into an already existing natural gas network and in this way enables storage and transport of energy to the consumer, and can thus relieve the load on an electrical grid. As an alternative to this, the hydrogen generated by the electrolyzer can also be immediately used further, for example for a fuel cell.

In an electrolyzer for hydrogen electrolysis, water is broken down into hydrogen and oxygen. In a PEM electrolyzer, distilled water as starting material is typically supplied on the anode side and split into hydrogen and oxygen at a proton-permeable membrane (proton exchange membrane; PEM). In this case, the water is oxidized at the anode to oxygen. The protons pass through the proton-permeable membrane. Hydrogen is produced on the cathode side.

The water should be conveyed constantly into the anode space and/or cathode space here, in order to ensure a uniform distribution of the water in these spaces and hence also an effective electrolytic cleavage of the water. The water is typically conveyed by pumps. Disadvantageously, pumps require regular maintenance. In addition, the pump rate has to be regulated depending on the pressure in the electrolysis cell in order to achieve a uniform starting material throughput. This disadvantageously requires additional control technology, making the construction of the electrolyzer more complex. In addition, the pumps consume electrical energy, which adversely reduces the overall efficiency of the electrolysis.

SUMMARY OF INVENTION

It is therefore an object of the present invention to specify a water electrolyzer and a method for operating a water electrolyzer which is energy efficient and low maintenance.

The object is achieved with an electrolysis unit as claimed and a method as claimed.

The electrolysis device according to the invention for the electrolysis of water comprises at least one electrolysis cell, wherein the electrolysis cell comprises an anode space having an anode and a cathode space having a cathode. The anode space is separated from the cathode space by means of a proton exchange membrane. The anode space is suitable for receiving water and oxidizing it at the anode to give a first product comprising oxygen. The cathode space is suitable for receiving water and reducing it at the cathode to give a second product comprising hydrogen. The electrolysis device additionally comprises a first gas separating apparatus for the separation of oxygen, wherein the first gas separating apparatus is arranged above the electrolysis cell for the purposes of performing a natural circulation of water.

In the method according to the invention for operating an electrolysis device for the electrolysis of water, in an electrolysis cell an oxygen-comprising first product and a hydrogen-comprising second product are produced by means of an acidic electrolysis from water as starting material. Circulation of the starting material, the first product and/or the second product is effected in the form of natural circulation.

"Natural circulation" is understood to mean a circulation of the water into the electrolysis cell and through the electrolysis cell, and a circulation of the water and the products out of the electrolysis cell toward the gas separating apparatus, which takes place "naturally", that is to say without the use of pumps, due to the density differences of the components. The gas bubbles forming in the electrolysis cell lead to a lower density of the water. On account of the density difference, the water and the products flow through the electrolysis cell without the use of a mechanical pump.

Advantageously, therefore, both the supply of water and the thermal management of the electrolysis device are effected by means of natural circulation, both on the oxygen side and on the hydrogen side or exclusively on the oxygen side. The use of a mechanical circulating device for circulating the water and the products is thus advantageously avoided. This expediently reduces intervals of maintenance of the installation and hence also the downtime of the installation. Advantageously, because of the physical principle of natural circulation involving density differences, the water conveying rate regulates itself, that is to say without the intervention of controllers, where in the case of a suitable process design the water conveying rate adapts to the heat loss of the installation. In other words, this means that in the event of elevated heat production the water conveying rate rises. It is additionally the case that the higher the gas separator is arranged above the electrolysis cell, the higher the conveying rate achieved, provided that the gas/water mixture comprises a constant amount of gas.

In an advantageous embodiment and development of the invention, the electrolysis device comprises a first line which is connected to an upper section of the anode space and to the first gas separating apparatus. The electrolysis device additionally comprises a second line which is connected to the first gas separator and to a lower section of the anode space.

The first line serves as a riser pipe and the second line serves as a downpipe. The water with the products thus advantageously rises within the first line up into the gas separating apparatus. In the gas separating apparatus, the gas—that is to say the product (in this case oxygen)—is separated from the water. The water, which now once again has a higher density compared to the product/water mixture, is led via the second line, that is to say the downpipe, back into the anode space of the electrolysis cell. There, oxygen is produced once again, which lowers the density and so the water/product mixture again rises up in the riser pipe.

In a further advantageous embodiment and development of the invention, the electrolysis device has a second gas separating apparatus for the separation of hydrogen, a third line which is connected to an upper section of the cathode space and to the second gas separating apparatus, and a fourth line which is connected to the second gas separating apparatus and to a lower section of the cathode space, wherein the second gas separating apparatus is arranged above the electrolysis cell for the purposes of performing a natural circulation of water.

The third line serves as a riser pipe, the fourth line serves as a downpipe, these lines connecting the second gas separating apparatus to the cathode side of the electrolysis cell. The water/hydrogen mixture, which has a lower density than pure water, advantageously rises up in the riser pipe. It thus arrives in the second gas separating apparatus, where the hydrogen is separated from the water. The water, which now once again has a higher density than the product/water mixture, is led via the downpipe, that is to say the fourth line, back into the cathode space.

In a further advantageous embodiment and development of the invention, a first diameter of the first line is smaller than a second diameter of the third line.

In simplified form, the cleavage of water takes place according to equation 1:

$$H_2O(l) \rightarrow H_2(g) + \tfrac{1}{2}O_2(g) \tag{1}$$

It is clear from equation (1) that about double the volume of hydrogen is formed compared to oxygen. In the case of a cell and pipeline arrangement of the electrolyzer which is configured similarly for the hydrogen side and the oxygen side, the hydrogen side therefore has a higher water conveying rate than the oxygen side. If the electrolysis unit is designed such that the conveying rate through the riser pipe, that is to say the first and/or third line, is limited, the conveying rate can be optimized by adapting the riser pipe diameter. On account of the lower gas volume flow rate on the oxygen side, it is possible that there is a lower water conveying rate there. If the diameter of the riser pipe on the oxygen side, i.e. the first line, is dimensioned smaller than the third line, a higher water conveying rate can advantageously be achieved. It is particularly advantageous when the first line on the oxygen side has about half the cross-sectional area compared to the cross-sectional area of the third line on the hydrogen side.

In a further advantageous embodiment and development of the invention, a first heat exchanger is arranged in the second line and a second heat exchanger is arranged in the fourth line. The first and the second heat exchanger are particularly advantageously thermally coupled.

In a further advantageous embodiment and development of the invention, the first and the second heat exchanger are coupled to one another so as to allow transfer of material. In other words, this means that there is only one, common heat exchanger. This can in particular comprise two inlet openings, one for the oxygen-side water and one for the hydrogen-side water, and a common outlet opening.

Within the electrolysis cell, for process-related reasons, during the water cleavage process in addition to protons water is also transported from the oxygen side, that is to say from the anode space, to the hydrogen side, that is to say to the cathode space. If the anode-side water and the cathode-side water are separated from each other, this disadvantageously results in a shift in levels in the gas separating apparatuses. The mixing of material in the heat exchanger thus advantageously prevents a shift in levels in the gas separating apparatuses. It is thus advantageously avoided that the cathode space or anode space are completely emptied such that mixing of the hydrogen and oxygen gas takes place. A slight increase in the hydrogen concentration on the oxygen side does not conflict with reliable operation of the electrolysis installation, since only the dissolved gases are mixed and there is no mixing of any gas phase. It is accordingly also advantageous in particular if this mixing occurs at the lowest point in the installation, in order to achieve the greatest possible separation between the two gas phases comprising oxygen and, respectively, hydrogen.

In a further advantageous embodiment and development of the invention, which is an alternative to the heat exchangers coupled so as to allow transfer of material, the second line and the fourth line are connected via a connection line for the purposes of water equalization. This connection line, also called a bypass line, is arranged in such a way that the anode-side water and the cathode-side water are mixed shortly before entry into the electrolysis cell, in particular at the lowest point of the installation.

Within the electrolysis cell, for process-related reasons, during the water cleavage process in addition to protons a certain amount of water is also transported from the oxygen side to the hydrogen side. If the anode-side water and the cathode-side water are separated from each other, this disadvantageously results in a shift in levels in the gas separating apparatuses. This shift in levels due to the water transport, brought about by the process, from the oxygen side to the hydrogen side in the electrolysis cell is advantageously avoided. This advantageously avoids the need for replenishment of water in one of the gas separating apparatuses by means of pumps. As a result of mixing the two water streams together shortly before entry into the electrolysis cell, there is only a minor transport of dissolved hydrogen to the oxygen side of the electrolysis cell, which does not imperil reliable operation of the installation.

In a further advantageous embodiment, the electrolysis device comprises at least two electrolysis cells and at least two first gas separating apparatuses, the first gas separating apparatuses being connected via a siphon-like fifth line which is suitable for conducting the water.

In a further advantageous embodiment and development of the invention, the electrolysis device comprises at least two electrolysis cells and at least two second gas separating apparatuses. The second gas separating apparatuses are connected via a siphon-like sixth line which is suitable for conducting the water.

These connection lines advantageously simplify the structure of an electrolysis stack, that is to say an electrolysis unit comprising at least two electrolysis cells, since the number of lines is reduced.

In a further advantageous embodiment and development of the invention, the electrolysis device comprises a closable opening to the cathode space which is suitable for partially receiving a seventh line, in other words a second riser line, which connects the cathode space to the second gas separating apparatus. This seventh line is arranged in the cathode space opposite the third line. If it becomes necessary to increase the hydrogen conveying rate, which the third line can no longer ensure as riser pipe, then the hydrogen/water mixture can additionally rise up into the second gas separating apparatus via the seventh line. The effective cross section of the riser pipe is thus achieved by the hydrogen/water mixture flowing out of the electrolysis cell on both sides, which advantageously prevents limiting of the conveyance of water. It has been found from experiments that the operating point of the electrolysis installation can thus be returned back to an optimum operating point with respect to the conveying characteristics.

In a further advantageous embodiment and development of the invention, the electrolysis device comprises a supply line for fresh water. This is arranged such that the fresh water can be added to the fifth and/or the sixth line. Particularly, the amount of water that has been consumed in the reaction is fed to the fifth line, that is to say the connection line of the first gas separating apparatuses for oxygen. The water then particularly advantageously replaces the water consumed on the anode side. This advantageously avoids an additional pipeline to the individual gas separating apparatuses, which simplifies the structure of the electrolysis unit. A connection of the first and/or second gas separating apparatuses equalizes the filling level of the first and/or second gas separating apparatuses via the water return line. As a result of the respective connection of the hydrogen and oxygen gas separators via the water circuit prior to entry into the cell stack, these equalize each other in turn. Because of the levelling effect on each gas side/the equalization of the gas sides via the heat exchanger circuit, the electrolysis cells, or a plurality of connected electrolysis stacks, advantageously have a mutually equalized fill level in the respective gas separating apparatuses.

In a further advantageous embodiment and development of the invention, the operating pressure in the electrolysis device is in a range from 0.5 bar to 2 bar, particularly is one bar, that is to say atmospheric pressure. At this atmospheric pressure the density differences due to gas production in the electrolysis cell are sufficiently great for natural circulation to reliably take place and hence for the electrolysis unit to be able to be operated without the use of pumps. In other words, the operating pressure of the electrolysis device is at most 0.5 bar above or below the operating pressure of the first and/or second gas separating apparatus.

In a further advantageous embodiment and development of the invention, the oxygen/water mixture is supplied from the first line into the first gas separating apparatus at the level of the liquid fill level in the first gas separating apparatus. In other words, the supply opening in the first gas separating apparatus is located at the height of the phase boundary between gas and liquid in the first gas separating apparatus. Advantageously, the hydrogen/water mixture is also added from the third line into the second gas separating apparatus at the height of a second liquid filling level constituting the phase boundary in the second gas separating apparatus. In other words, this also means that the supply opening in the second gas separating apparatus is present at the height of the phase boundary between gas and liquid. Advantageously, the conveying rate is higher when the distance between the return line from the first and/or second gas separating apparatus is designed to be minimal.

In a further advantageous embodiment and development of the invention, the fifth and/or sixth line comprises at least one pressure control valve. The pressure control valves are located at the end of the pipeline connecting the gas separating apparatuses of a respective gas side to one another. If, for example, the first and second gas separating apparatuses are of identical mechanical construction, it is crucial that there is no shift in levels. That is to say, if one gas side has a relatively high pressure, the water is displaced on the corresponding other gas side. The use of a pressure control valve advantageously prevents this.

BRIEF DESCRIPTION OF THE DRAWINGS

Further features, properties and advantages of the present invention can be found in the following description with reference to the appended figures. In the figures, in each case schematically.

DETAILED DESCRIPTION OF INVENTION

Figure 1:
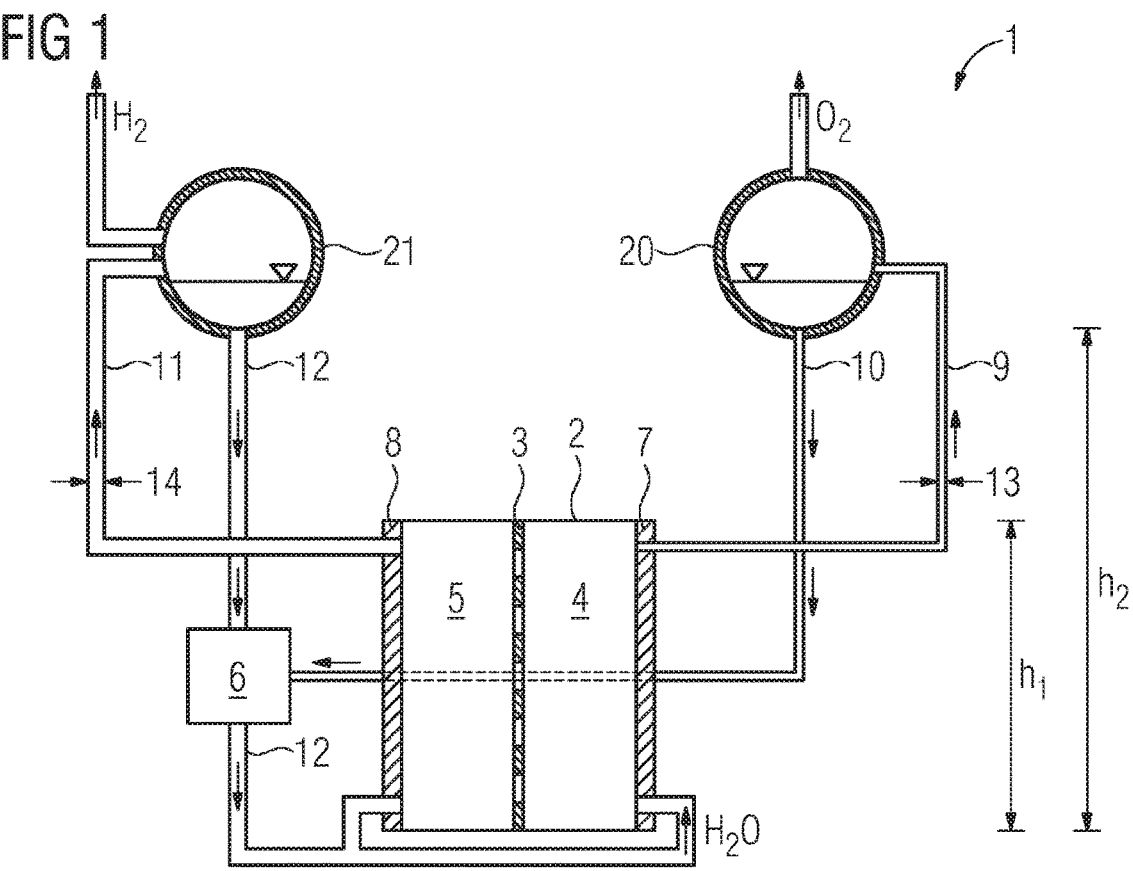
FIG. 1 shows an electrolysis unit having a first and a second gas separating apparatus.

FIG. 1 shows a first exemplary embodiment of an electrolysis unit 1 having an electrolysis cell 2. The electrolysis cell 2 comprises a proton exchange membrane 3 which separates the anode space 4 from the cathode space 5. The anode space 4 comprises an anode 7. The cathode space 5 comprises a cathode 8. In the anode space 4, water $H_2O$ is oxidized at the anode to oxygen $O_2$. The oxygen/water mixture forming in the anode space 4 during the electrolysis has a lower density than pure water. As a result, it rises up in the first line 9, also called a riser pipe, into a first gas separating apparatus 20. The first gas separating apparatus 20 is situated above the anode space 4. The oxygen separates from the water in the first gas separating apparatus 20. The oxygen $O_2$ can be conducted out from the electrolysis unit 1. The water is led via a second line 10 into a heat exchanger 6. In the cathode space, water is reduced at the cathode 8 to hydrogen $H_2$ during the electrolysis. The hydrogen/water mixture rises up via a third line 11 into a second gas separating apparatus 21 on account of the lower density compared to water. The hydrogen separates from the water in the second gas separating apparatus 21. The hydrogen leaves the electrolysis unit 1. The water can be led via a fourth line 12 into the heat exchanger. The water is subsequently led out from the heat exchanger 6 back into the anode space 4 and the cathode space 5. The heat exchanger is operated with a coolant, in particular water. No mass transfer occurs between this coolant and the water from the electrolysis. For the sake of clarity, the coolant feed stream and discharge stream from the heat exchanger 6 has not been depicted in FIGS. 1, 3 and 4.

The electrolysis unit 1 is advantageously operable dynamically, that is to say that depending on the load input the electrolysis unit 1 can be operated with an energy density of more than 0 A/cm² up to 4 A/cm², particularly of more than 1 A/cm² to 3 A/cm².

The first and the second gas separating apparatus 20, 21 are at a height $h_2$. The maximum height of the electrolysis cell is $h_1$. The height $h_2$ is above the height $h_1$. As a result, a natural circulation of the starting materials and products in the electrolyzer can be ensured solely on account of the density differences arising in the electrolyzer. However, both heights must lie above the height $h_1$ of the electrolysis cell. Additional pumps or other conveying means are advantageously not necessary. As an alternative to the embodiment depicted here, it is also possible to perform the natural circulation exclusively on the oxygen side, that is to say in the anode space 4. The water conveying rate regulates itself as a result of the principle of natural circulation based on the physical parameter of density. That is, given a suitable process design, at an elevated gas production rate the water conveying rate is increased, as a result of which the heat is in turn advantageously conducted away.

The operation of the natural circulation at atmospheric pressure is particularly advantageous, since here the size of the hydrogen and/or oxygen gas bubbles, and hence the resulting transportability with regard to the gases and the water, is sufficiently great such that pumps can be completely dispensed with.

The water circuits on the hydrogen side and the oxygen side, that is to say the water in the anode space 4 and in the cathode space 5, are connected to one another via the heat exchanger 6.

On account of the water cleavage reaction equation it is clear that about double the volume of hydrogen gas compared to oxygen gas is formed during the decomposition of water. Therefore, for an identically configured pipe diameter on the hydrogen side and on the oxygen side, the hydrogen side would exhibit a higher water conveying rate than the oxygen side, provided the conveying rate is not limited by the pipe diameter. If the conveying rate of the water is limited by the riser pipe, the conveying rate may be optimized by adapting the riser pipe diameter. In order thus to optimize the water flow rate on both sides, the first diameter 13 of the first line 9 is dimensioned smaller than the second diameter 14 of the third line 11. Particularly advantageously, the first line 9 has a cross-sectional area of roughly half the cross-sectional area of the third line 11. Compared to a conventional uniform pipe diameter distribution, a higher water conveying rate, particularly on the anode side, can advantageously be achieved.

Figure 2:
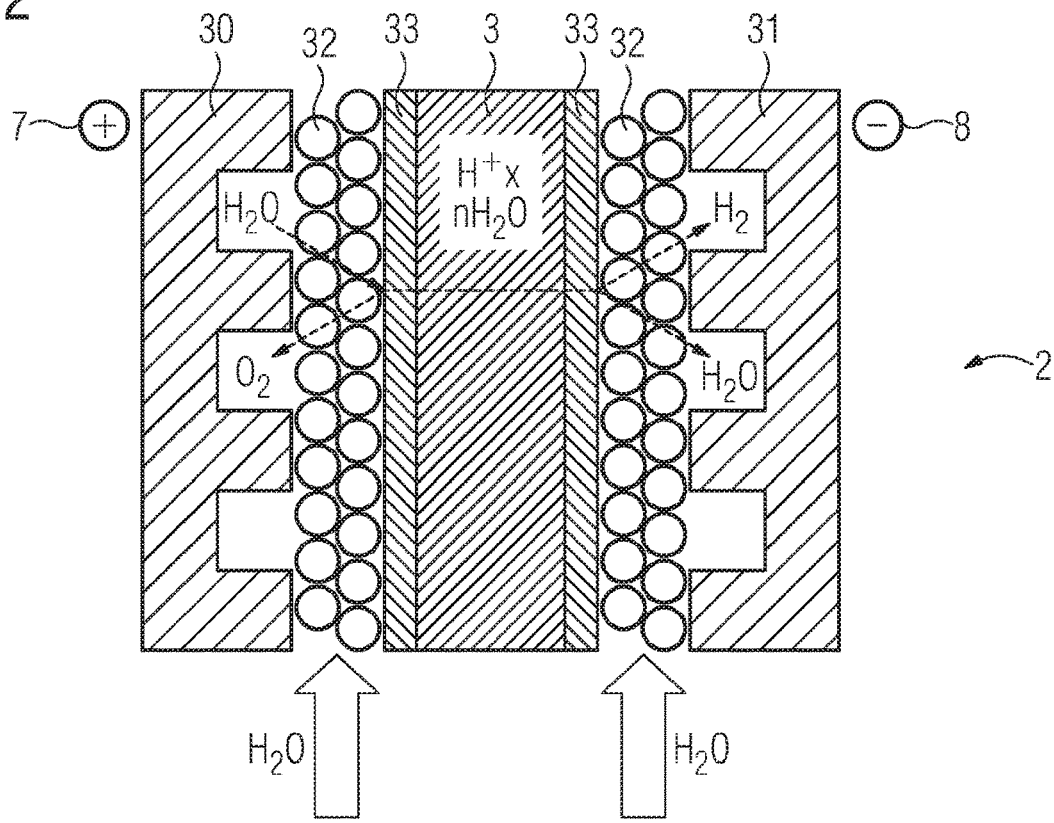
FIG. 2 shows an electrolysis cell having a proton exchange membrane.

FIG. 2 shows an electrolysis cell having a proton exchange membrane. The electrolysis cell comprises an anode 7 and a cathode 8. Bipolar plates 30, 31 in each case adjoin the two electrodes 7, 8. The bipolar plates each adjoin a porous support structure 32. The starting material water flows through the electrolysis cell 2 via this support structure 32. The porous support structure 32 in turn adjoins an electrocatalytic layer 33. One electrocatalytic layer 33 is arranged in the anode space 4, and one electrocatalytic layer 33 is arranged in the cathode space 5. The electrocatalytic layer 33 on the anode side typically comprises iridium; the electrocatalytic layer 33 on the cathode side typically comprises platinum. The proton exchange membrane PEM is situated between these two catalytic layers 33. This comprises in particular a sulfonated fluoropolymer, particularly comprising perfluorosulfonic acid. One advantage of the PEM electrolysis cell is that pure water can be used as the starting material. It is advantageous not to use any alkaline solution or other liquid components as a carrier component for the water.

In a further exemplary embodiment (not illustrated in the figures) of an electrolysis unit 1 having an electrolysis cell 2, an alternative arrangement of the riser pipes 11 from the cathode space 5 is used. All components are arranged in the same way as in the first exemplary embodiment in FIG. 1. Merely an additional riser pipe connects the cathode space 5 to the second gas separating apparatus 21. If, due to the existing operating conditions and despite the differing cross-sectional areas of riser pipes 10 and 11, the conveying rate is still insufficient, an additional, second riser line 15 may be present on the hydrogen side. This second riser line, in other words seventh line, advantageously guarantees a sufficiently high conveying rate of the water and of the hydrogen into the second gas separating apparatus 21. It is likewise conceivable that the first exemplary embodiment and the second exemplary embodiment can be combined. This means, in other words, that a second riser line is present but is only opened via the use of valves when it is required due to the conveying rate on the hydrogen side.

Figure 3:
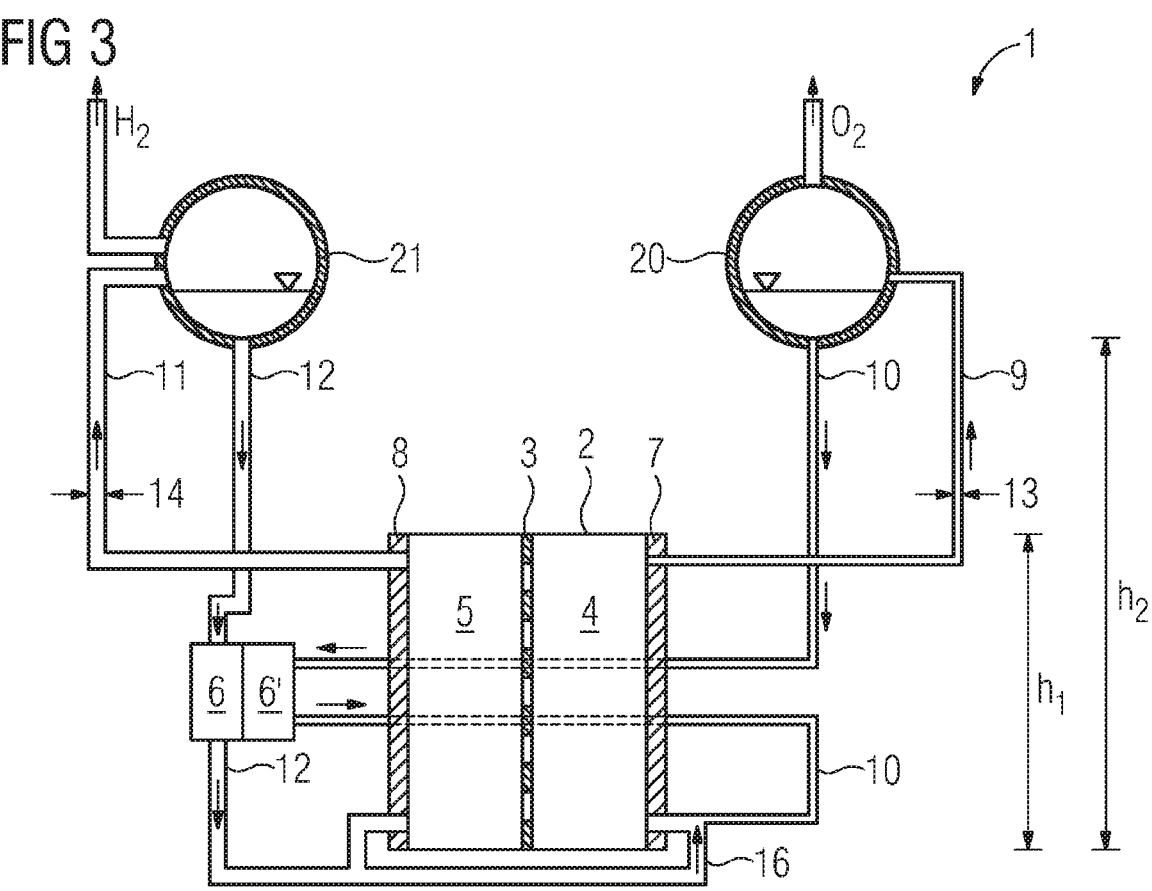
FIG. 3 shows an electrolysis unit having a first and a second gas separating apparatus and a water bypass.

FIG. 3 shows a third exemplary embodiment of an electrolysis unit 1 having an electrolysis cell 2 having a first gas separating apparatus 20 and a second gas separating apparatus 21. The gas separating apparatuses 20, 21 are respectively connected via riser pipes 9, 11 to the anode space 4 and cathode space 5, respectively. The gas separating apparatuses 20, 21 are connected to the heat exchanger 6 respectively via a second line 10 and a fourth line 12. The second line 10 in turn connects the heat exchanger 6 to the anode space 4. The fourth line 12 connects the heat exchanger 6. In other words, the heat exchanger 6 is arranged in the second line 10 and the heat exchanger 6' is likewise arranged in the fourth line 12. No mass transfer takes place here in the heat exchanger 6 and 6', such that the returned water on the anode side is separated from the returned water on the cathode side. The complete separation of the water circuits in this way would disadvantageously result in a shift in levels in the gas separators, since in the water cleavage reaction, in addition to protons, water is also transported from the oxygen side to the hydrogen side. By means of the pipeline arrangement illustrated in this third exemplary embodiment, which provides a bypass line 16 between the second line 10, that is to say the anode space 4, and the fourth line 12, that is to say the cathode space 5, the water circuits are connected to each other. The returning water streams are advantageously not mixed with each other in the heat exchanger 6 but instead only immediately before entry into the electrolysis cell 2. The connection of the cathode space to the anode side forms a communicating system which advantageously ensures equalization of the water stream from the hydrogen side to the oxygen side. A slight increase in the hydrogen concentration on the oxygen side does not impair the reliable operation of the installation. If the water streams are already mixed with each other in the heat exchanger 6, the residence time of the mixed water streams is markedly higher. As a result of this, there may be a rise in the respective foreign gas concentration in the gas separators. If merely a directed water stream is conducted from the hydrogen to the oxygen side in the form of the bypass connection 16, potentially only the hydrogen concentration in the oxygen in the gas separator increases. The reliability of the installation is thus advantageously further increased.

Figure 4:
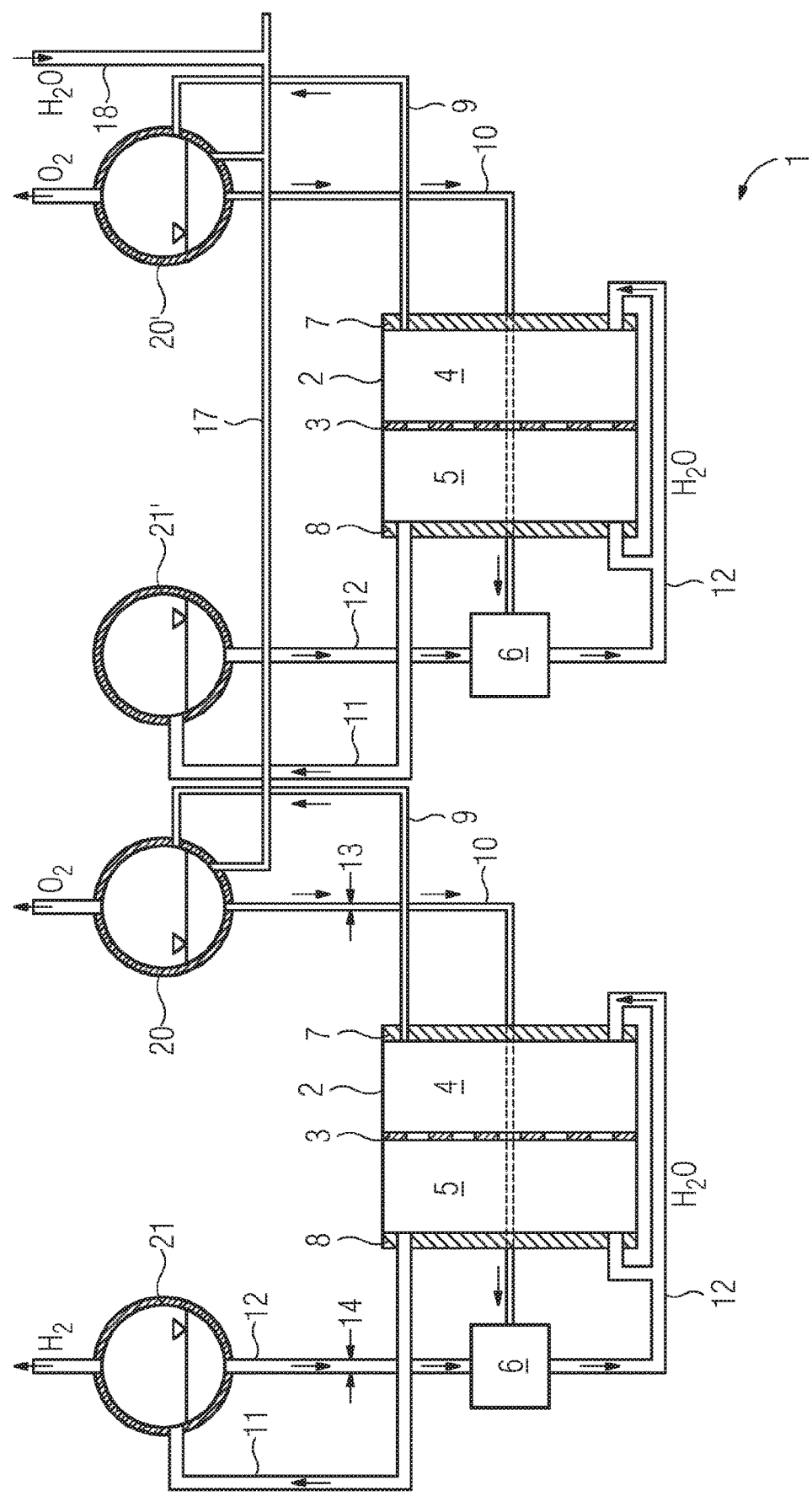
FIG. 4 shows an electrolysis unit comprising two electrolysis cells and interconnected first gas separating apparatuses.

It becomes clear in all three exemplary embodiments of FIGS. 1, 3 and 4 that the water/gas mixture is supplied in the gas separating apparatuses 20, 21 close to the phase boundary in the gas separating apparatuses 21 and 22. This is achieved by controlling pressure valves connected to the gas separating apparatuses 20, 21 (not shown in the figures). Since both vessels are hydraulically connected to each other, virtually the same filling level is established in both gas separating apparatuses 20 and 21. The prerequisite for this is that the pressure losses in the pipelines which are connected to the gas separating apparatuses 20, 21 which are caused by the gas stream do not generate any appreciable pressure losses in the gas separating apparatus 20, 21. In other words, the pipe diameters of the pipelines are so great that there is no limiting of the material stream and thus no shift in levels in the gas separating apparatuses 20, 21.

FIG. 4 shows an electrolysis unit 1 having two electrolysis cells 2. Both electrolysis cells each possess an oxygen-side, first gas separating apparatus 20, 20' and a hydrogen-side, second gas separating apparatus 21, 21'. The returning of the water has been configured analogously to the first exemplary embodiment such that the water streams flowing back mix in the heat exchanger and are subsequently conducted into the electrolysis cell back toward the oxygen side. As an alternative, it is also conceivable to carry out a bypass according to the third exemplary embodiment. The oxygen-side gas separating apparatuses 20, 20' are connected to each other via a siphon-like fifth line 17. The fifth line 17 additionally comprises a fresh water supply apparatus 18. This exemplary embodiment involves a one-sided circulating mode on the oxygen side. Connecting a plurality of electrolysis cells via the siphon-like fifth line 17 advantageously ensures the replenishment of water, which avoids the lowering of the liquid level in the gas separating apparatuses 20, 21 in an advantageous manner. The fresh water of the water consumed during the reaction is advantageously supplied into the fifth line 17 connecting the first gas separating apparatuses 20 to each other. This advantageously avoids an additional pipeline to the gas separating apparatuses.

In order to make the passing through of gas as unlikely as possible, and hence to avoid a failure, the first gas separating apparatuses 20, 20' on the oxygen side are connected to each other and, separately from this, the second gas separating apparatuses 21, 21' on the hydrogen side are connected to each other. In other words, the gas separating apparatuses are connected to each other only in such a way that the oxygen side remains separated from the hydrogen side. In addition to the exemplary embodiment shown in FIG. 5, it is therefore possible to also connect the second gas separating apparatuses 21 on the hydrogen side to each other via a siphon-like line. The filling levels between the second gas separating apparatuses 21 are thus advantageously equalized.

The invention claimed is:

1. An electrolysis device for electrolysis of water, comprising:
    a water electrolysis cell configured to electrolytically cleave water into hydrogen gas and oxygen (O2) gas, wherein the water electrolysis cell comprises an anode space comprising an anode and a cathode space comprising a cathode, wherein the anode space is separated from the cathode space by means of a proton exchange membrane, and the anode space is suitable for receiving the water and oxidizing it at the anode to give a first product comprising oxygen gas and the cathode space is suitable for receiving the water and reducing it at the cathode to give a second product comprising hydrogen gas;
    a first gas separating apparatus for separation of the first product comprising oxygen gas;
    a connection line that connects an external port of a lower section of the anode space to an external port of a lower section of the cathode space;
    a first line which is connected to an upper section of the anode space and to the first gas separating apparatus in which the water flows via natural circulation; and
    a second line which is connected to the first gas separating apparatus and leads to the connection line and in which the water flows via the natural circulation;
    wherein the external port of the lower section of the anode space is configured to receive water originating from the second line and water separately originating from the connection line; and
    wherein the first gas separating apparatus is arranged above the water electrolysis cell in a manner that is effective to generate the natural circulation of water in which the water flows from the anode space to the first gas separating apparatus and then back to the connection line via only the natural circulation.

2. The electrolysis device as claimed in claim 1, further comprising:
    a second gas separating apparatus for separation of the second product comprising hydrogen gas;
    a third line which is connected to an upper section of the cathode space and to the second gas separating apparatus; and
    a fourth line which is connected to the second gas separating apparatus and to the connection line,
    wherein the second gas separating apparatus is arranged above the water electrolysis cell in a manner that is effective to generate a natural circulation of water in which the water flows in the third line and then in the fourth line via only the natural circulation.

3. The electrolysis device as claimed in claim 2, wherein at least one of:
    a first heat exchanger is arranged in the second line and configured to exchange heat but not mass between a coolant and the water in the second line, and
    a second heat exchanger is arranged in the fourth line and configured to exchange heat but not mass between the coolant and the water in the fourth line.

4. The electrolysis device as claimed in claim 3,
    wherein the first heat exchanger is arranged in the second line and the second heat exchanger is arranged in the fourth line; and
    wherein the first heat exchanger and the second heat exchanger are thermally coupled.

5. The electrolysis device as claimed in claim 2,
    wherein a first heat exchanger is configured to receive the water from the second line and to receive the water from the fourth line, to allow the water from the second line to mix with the water from the fourth line, and to exchange heat but not mass between a coolant and both the water from the second line and the water from the fourth line.

6. The electrolysis device as claimed in claim 2,
    wherein the second line, the fourth line, and the connection line and are configured to cause water equalization between the anode space and the cathode space.

7. The electrolysis device as claimed in claim 6, wherein a first heat exchanger is arranged in the second line, a second heat exchanger is arranged in the fourth line, the second line and the fourth line are discrete between the respective gas separation device and respective heat exchanger, and the second line and the fourth line are connected via the connection line between the respective heat exchanger and the respective space.

8. The electrolysis device as claimed in claim 7, wherein the connection line is disposed at a lowest point in the electrolysis device.

9. The electrolysis device as claimed in claim 2, wherein a diameter of the first line is smaller than a diameter of the third line.

10. The electrolysis device as claimed in claim 9, wherein a cross sectional area of the third line is at least twice a cross sectional area of the first line.

11. The electrolysis device as claimed in claim 9, wherein a difference between the diameter of the first line and the diameter of the second line is configured to account for a difference between a volume of hydrogen formed and a volume of oxygen formed as a result of a cleavage of water in the electrolysis device.

12. The electrolysis device as claimed in claim 1, wherein the water electrolysis cell is configured to maintain an operating pressure with a range from 0.5 bar to 2 bar.

13. The electrolysis device as claimed in claim 1, wherein the water electrolysis cell is configured to maintain an operating pressure at one bar.

14. An electrolysis device for electrolysis of water, comprising:
- a water electrolysis cell configured to electrolytically cleave water into hydrogen gas and oxygen (O2) gas, wherein the water electrolysis cell comprises an anode space comprising an anode and a cathode space comprising a cathode, wherein the anode space is separated from the cathode space by means of a proton exchange membrane, and the anode space is suitable for receiving the water and oxidizing it at the anode to give a first product comprising oxygen gas and the cathode space is suitable for receiving the water and reducing it at the cathode to give a second product comprising hydrogen gas;
- a first gas separating apparatus for separation of the first product comprising oxygen gas;
- a first line which is connected to an upper section of the anode space and to the first gas separating apparatus in which the water flows via natural circulation;
- a second line that is directly connected to an external port of the lower section of the anode space at an end of the second line, that is connected to the first gas separating apparatus, and in which the water flows via the natural circulation;
- a second gas separating apparatus for separation of the second product comprising hydrogen gas;
- a third line which is connected to an upper section of the cathode space and to the second gas separating apparatus;
- a fourth line that is directly connected to an external port of the lower section of the cathode space at an end of the fourth line, and that is connected to the second gas separating apparatus; and
- a connection line comprising a first end that is directly connected to the end of the second line and a second end that is directly connected to the end of the fourth line;
- wherein the first gas separating apparatus is arranged above the water electrolysis cell in a manner that is effective to generate the natural circulation of water in which the water flows from the anode space to the first gas separating apparatus and then back to the connection line via only the natural circulation.

15. An electrolysis device for electrolysis of water, comprising:
- a water electrolysis cell configured to electrolytically cleave water into hydrogen gas and oxygen (O2) gas, wherein the water electrolysis cell comprises an anode space comprising an anode and a cathode space comprising a cathode, wherein the anode space is separated from the cathode space by means of a proton exchange membrane, and the anode space is suitable for receiving the water and oxidizing it at the anode to give a first product comprising oxygen gas and the cathode space is suitable for receiving the water and reducing it at the cathode to give a second product comprising hydrogen gas;
- a first gas separating apparatus for separation of the first product comprising oxygen gas;
- a first line which is connected to an upper section of the anode space and to the first gas separating apparatus in which the water flows via natural circulation;
- a connection line that connects an external port of a lower section of the anode space to an external port of a lower section of the cathode space;
- a second line that is directly connected to the external port of the lower section of the anode space at an end of the second line, that is connected to the first gas separating apparatus, and in which the water flows via the natural circulation;
- a second gas separating apparatus for separation of the second product comprising hydrogen gas;
- a third line which is connected to an upper section of the cathode space and to the second gas separating apparatus; and
- a fourth line that is directly connected to the external port of the lower section of the cathode space at an end of the fourth line, that is connected to the second gas separating apparatus, and that is connected to the connection line, wherein the fourth line is configured to supply a flow of the water to the external port of the lower section of the cathode space and to separately supply a flow of the water to the connection line;
- wherein the first gas separating apparatus is arranged above the water electrolysis cell in a manner that is effective to generate the natural circulation of water in which the water flows from the anode space to the first gas separating apparatus and then back to the connection line via only the natural circulation.

16. A method for operating an electrolysis device for electrolysis of water as claimed in claim 1, the method comprising:
- producing in the water electrolysis cell the first product comprising oxygen gas and the second product comprising hydrogen gas by means of electrolysis at the proton exchange membrane from water as a starting material,
- wherein circulating of the starting material and at least one of the first product comprising oxygen gas and the second product comprising hydrogen gas is effected in the form of the natural circulation.

17. The method as claimed in claim 16, wherein a prevailing operating pressure in the electrolysis device is atmospheric pressure.

* * * * *